DEFENSIVE PUBLICATION

UNITED STATES PATENT AND TRADEMARK OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent and Trademark Office makes no assertion as to the novelty of the disclosed subject matter.

PUBLISHED DECEMBER 2, 1975

941 O.G. 6

T941,004
REACTIVE FILLERS FOR UNSATURATED RESINS

Clarence C. Dannelly, Rte. 8, Cochise Trail, Kingsport, Tenn. 37664

Filed Aug. 1, 1974, Ser. No. 494,020
**Int. Cl. C08f *43/08***
U.S. Cl. 260—862
No Drawing. 9 Pages Specification

Particulate substances containing polymerizable olefinic unsaturation useful as reactive fillers for resins which achieve final form and useful properties by polymerization of olefinic unsaturation. The reactive fillers are particularly useful as modifiers for unsaturated polyester resins. In this application, the reactive fillers can be used during formation of a shaped article, impart special physical properties such as improved impact resistance, impart improved dimensional stability, and impart improved appearance. The reactive fillers are made by polymerizing substances or mixtures which contain more than one type of olefinic unsaturation, at least one of which can form copolymers but will not form homopolymers under the reaction conditions used to make the filler and wherein a part of this type of unsaturation remains in the reactive filler material and is available for subsequent polymerization reactions.